(12) United States Patent
Pino et al.

(10) Patent No.: US 12,734,751 B2
(45) **Date of Patent: *Sep. 15, 2026**

(54) MINIMAL CONTACT SLIDE FOR TOUCH INDICATION

(71) Applicant: Honeywell Federal Manufacturing & Technologies, LLC, Kansas City, MO (US)

(72) Inventors: Ruben A. Pino, Kansas City, MO (US); Ryan J. Eickbush, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 268 days.

This patent is subject to a terminal disclaimer.

(21) Appl. No.: 18/537,264

(22) Filed: Dec. 12, 2023

(65) Prior Publication Data

US 2024/0123679 A1 Apr. 18, 2024

Related U.S. Application Data

(63) Continuation of application No. 17/538,231, filed on Nov. 30, 2021, now Pat. No. 11,878,465.

(51) Int. Cl.

| | |
|---|---|
| ***B29C 64/209*** | (2017.01) |
| ***B29C 64/25*** | (2017.01) |
| ***B29C 64/386*** | (2017.01) |
| ***B33Y 30/00*** | (2015.01) |

(52) U.S. Cl.

CPC ............ *B29C 64/209* (2017.08); *B29C 64/25* (2017.08); *B29C 64/386* (2017.08); *B33Y 30/00* (2014.12)

(58) Field of Classification Search

CPC ....... B29C 64/209; B29C 64/25; B29C 64/38; B33Y 30/00

See application file for complete search history.

(56) References Cited

U.S. PATENT DOCUMENTS

| | | | | |
|---|---|---|---|---|
| 2019/0030817 | A1* | 1/2019 | Ciscon | B33Y 30/00 |
| 2019/0329274 | A1* | 10/2019 | Choi | B05B 12/00 |

FOREIGN PATENT DOCUMENTS

| | | | | |
|---|---|---|---|---|
| EP | 3117982 B1 | * 12/2019 | | B29C 64/118 |
| WO | WO-2014117249 A1 | * 8/2014 | | F15B 15/261 |
| WO | WO-2022232022 A1 | * 11/2022 | | B33Y 30/00 |

* cited by examiner

*Primary Examiner* — Galen H Hauth
*Assistant Examiner* — Mohamed K Ahmed Ali
(74) *Attorney, Agent, or Firm* — Hovey Williams LLP

(57) ABSTRACT

A nozzle holder assembly for a three-dimensional printer comprises a mount, a printer nozzle, and a locking mechanism. The mount is operable to be secured to the three-dimensional printer. The printer nozzle shaft is movably coupled to the mount along a predetermined length. The locking mechanism is configured to fix the printer nozzle shaft relative to the mount at any position along the predetermined length.

15 Claims, 9 Drawing Sheets

28A
42A
82A
84A
86A
44A
38A

MINIMAL CONTACT SLIDE FOR TOUCH INDICATION

RELATED APPLICATIONS

The present application is a continuation application and claims priority of co-pending U.S. patent application Ser. No. 17/538,231, filed on Nov. 30, 2021, and entitled "MINIMAL CONTACT SLIDE FOR TOUCH INDICATION", which is hereby incorporated in its entirety by reference herein.

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Three-dimensional printers often use nozzles, or other tools, for depositing material. When a tool is lowered to a printing surface, the tool needs to be calibrated at a beginning position in which it is in contact or within a predetermined distance to the printing surface to avoid the tool being lowered too far and damaging the tool and/or the printed part. Current methods of calibrating use a micro-adjuster and shim to securely hold the tool at the beginning position. This is a time-consuming process that often results in the tool becoming non-normal to the surface or otherwise crooked. This problem is exacerbated when multiple tools are used to simultaneously print multiple parts.

The background discussion is intended to provide information related to the present invention which is not necessarily prior art.

SUMMARY OF THE INVENTION

The present invention solves the above-described problems and other problems by providing a nozzle holder assembly, a method of calibrating a three-dimensional printer, and a three-dimensional printer that enable minimal contact during calibration of a tool.

A nozzle holder assembly constructed according to an embodiment of the present invention comprises a mount, a printer nozzle, and a locking mechanism. The mount is operable to be secured to the three-dimensional printer. The printer nozzle shaft is movably coupled to the mount along a predetermined length.

The locking mechanism is configured to fix the printer nozzle shaft relative to the mount at any position along the predetermined length. Because the locking mechanism can fix the nozzle at multiple positions along the predetermined length, the nozzle holder assembly can be lowered until contact is detected and then locked into place without damaging the nozzle when the assembly is lowered after initial contact. Further, it can be implemented on a three-dimensional printer with multiple printer heads that may have different relative elevations from the printing surface.

A method of calibrating a three-dimensional printer according to an embodiment of the present invention broadly comprises lowering, via an actuator, a plurality of nozzle holder assemblies; sensing, via a plurality of sensors of the nozzle holder assemblies, when printer nozzle shafts move relative to mounts of the nozzle holder assemblies; emitting, via the sensors, signals indicative of movement of the printer nozzle shafts; and fixing, via locking mechanisms, the positions of the printer nozzle shafts relative to their respective mounts.

A three-dimensional printer constructed according to an embodiment of the present invention broadly comprises a build platform, a frame, and a plurality of nozzle assemblies. The build platform supports parts to be printed, and the frame is shiftable above the build platform. Each of the nozzle assemblies comprise a mount, a printer nozzle shaft, and a locking mechanism. The mount is operable to couple to the frame. The printer nozzle shaft is movably coupled to the mount along a predetermined length. The locking mechanism is configured to fix the printer nozzle shaft relative to the mount at any position along the predetermined length.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
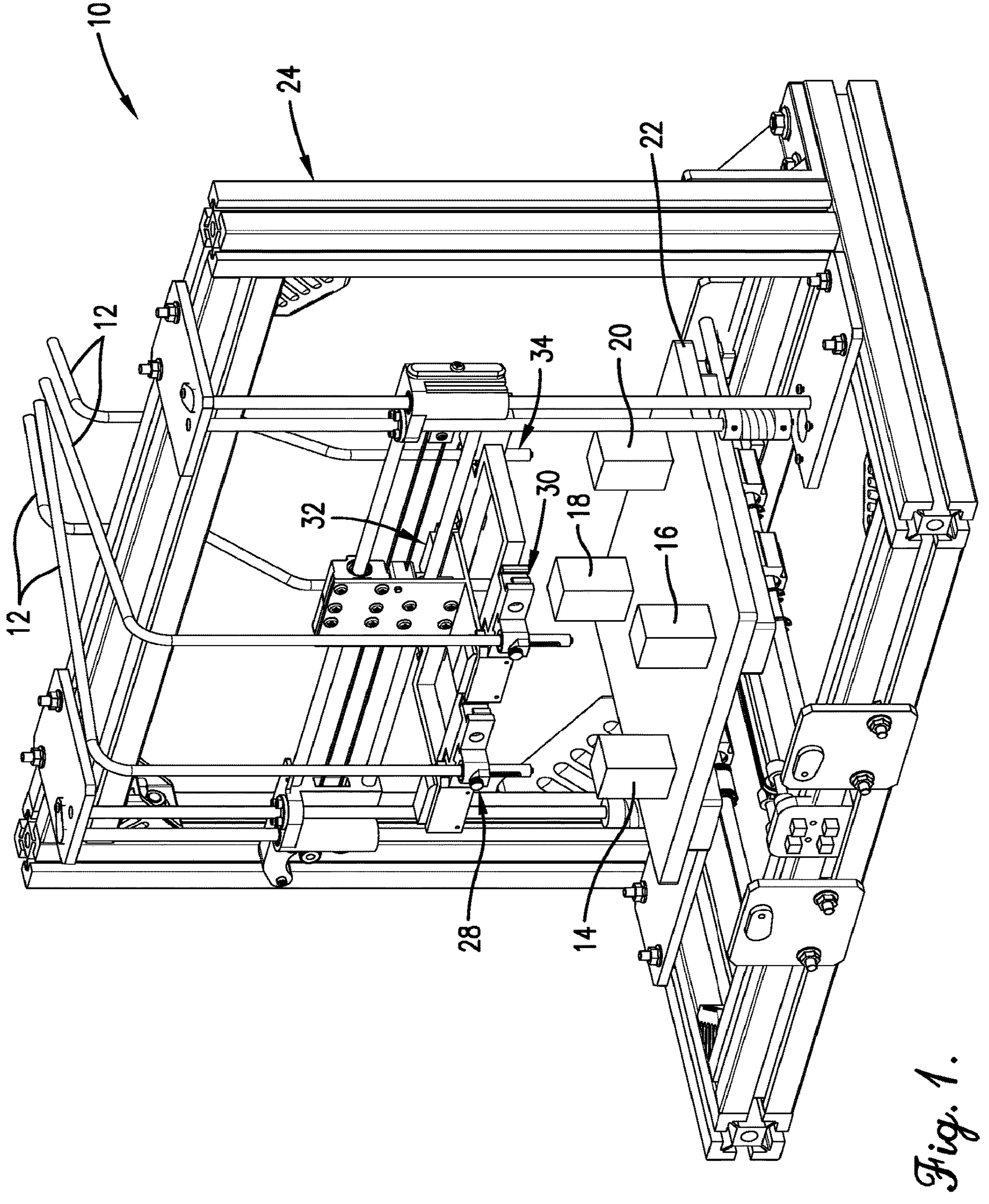
FIG. 1 is a perspective view of a three-dimensional printer constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to “one embodiment”, “an embodiment”, or “embodiments” mean that the feature or features being referred to are included in at least one embodiment of the technology. Separate references to “one embodiment”, “an embodiment”, or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, a three-dimensional printer 10 constructed in accordance with an embodiment of the invention is illustrated. The illustrated three-dimensional printer 10 is a fused deposition modeling printer, but the printer 10 may be any kind of printer or additive manufacturing system without departing from the scope of the present invention. The three-dimensional printer 10 may be supplied printing material via one or more supply lines 12 from a source (not shown). The printing material may comprise plastic, metal, organic matter, or the like.

Figure 8:
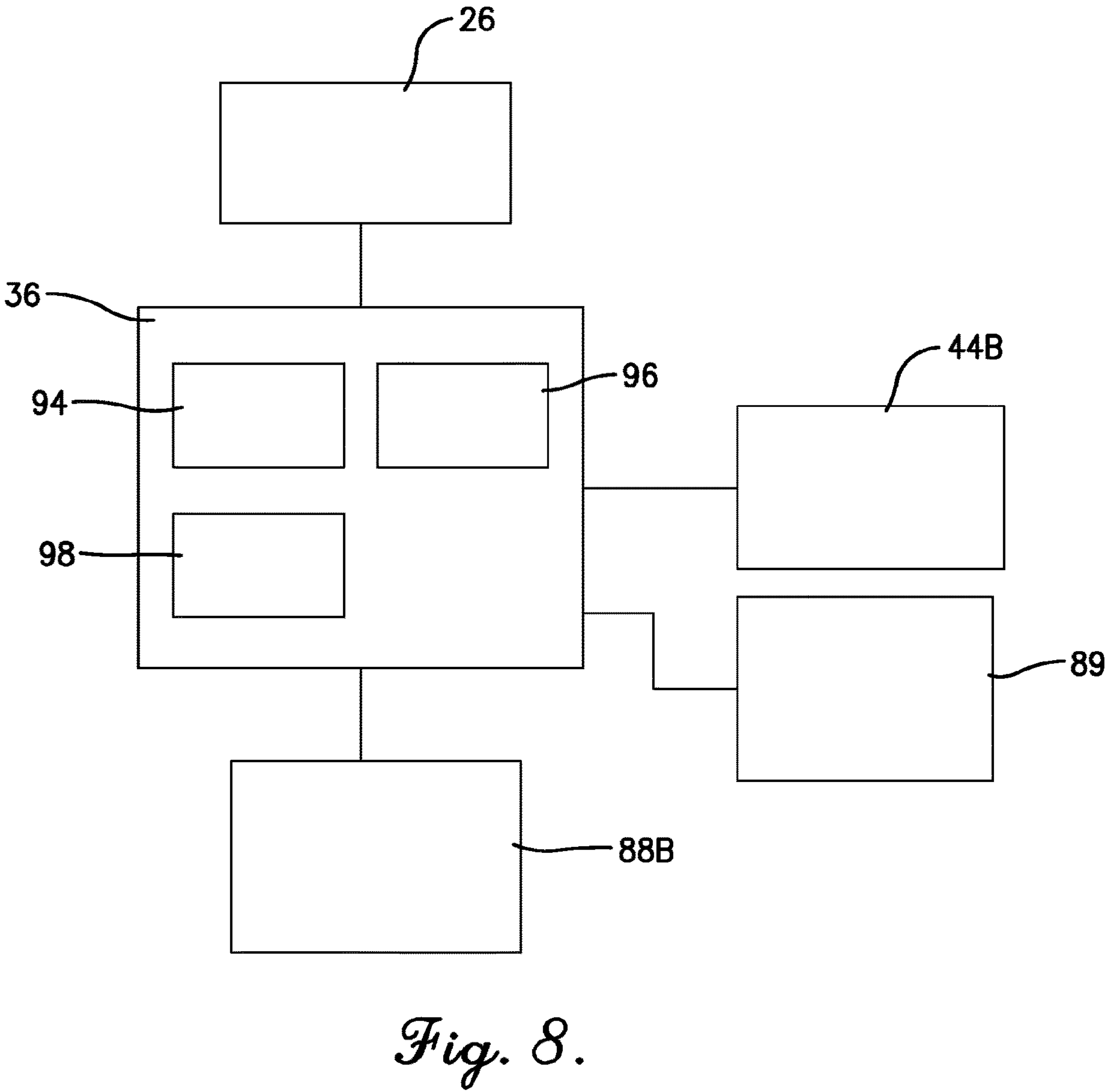
FIG. 8 is a block diagram depicting selected components of the three-dimensional printer of FIG. 1.

The printer 10 may be configured to simultaneously print a plurality of objects 14, 16, 18, 20 and comprises a build platform 22, a frame 24, a plurality of actuators 26 (depicted in FIG. 8), a plurality of nozzle assemblies 28, 30, 32, 34, and a controller 36 (depicted in FIG. 8). The objects 14, 16, 18, 20 may be three-dimensional objects or components. The objects 14, 16, 18, 20 may be substantially identical and have substantially the same dimensions and structures.

The build platform 22 supports the objects 14, 16, 18, 20 as they are built. The frame 24 movably supports the build platform 22 and the nozzle assemblies 28, 30, 32, 34 so that they can shift relative to one another. For example, the frame 24 may support the build platform 22 so that it shifts in an x-axis direction, and the frame 24 may allow the nozzle assemblies 28, 30, 32, 34 to shift in a y-axis direction and a z-axis direction. The actuators 26 (depicted in FIG. 8) are operable to actuate the frame 24 to cause the build platform 22 and/or the nozzle assemblies 28, 30, 32, 34 to shift. The actuators 26 may comprise servomotors, pneumatic devices, hydraulic devices, or the like. The build platform 22, the frame 24, and the actuators 26 may be configured to shift any number of ways without departing from the scope of the present invention.

Figure 2:
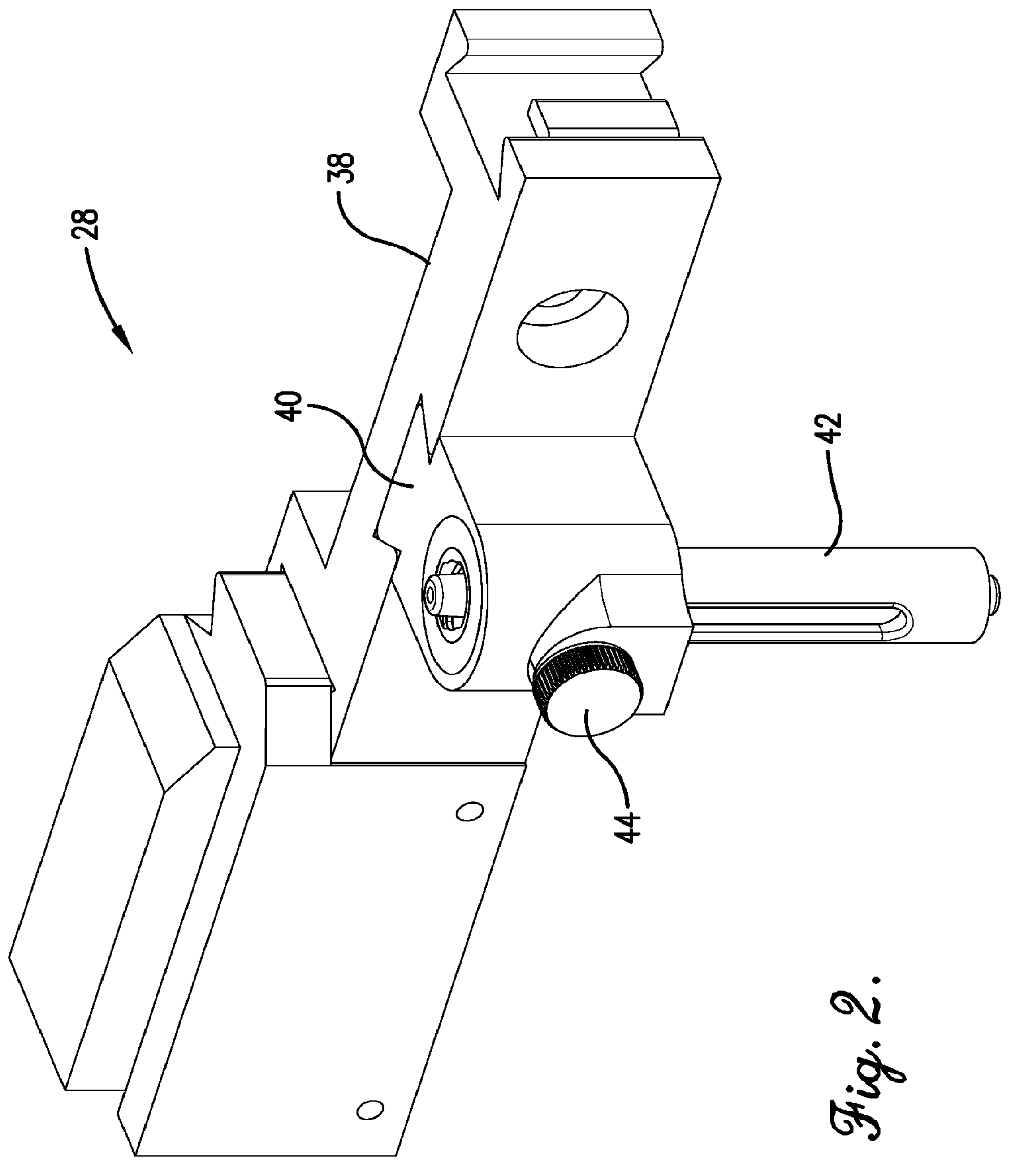
FIG. 2 is a perspective view of a nozzle holder assembly of the three-dimensional printer of FIG. 1.
Figure 3:
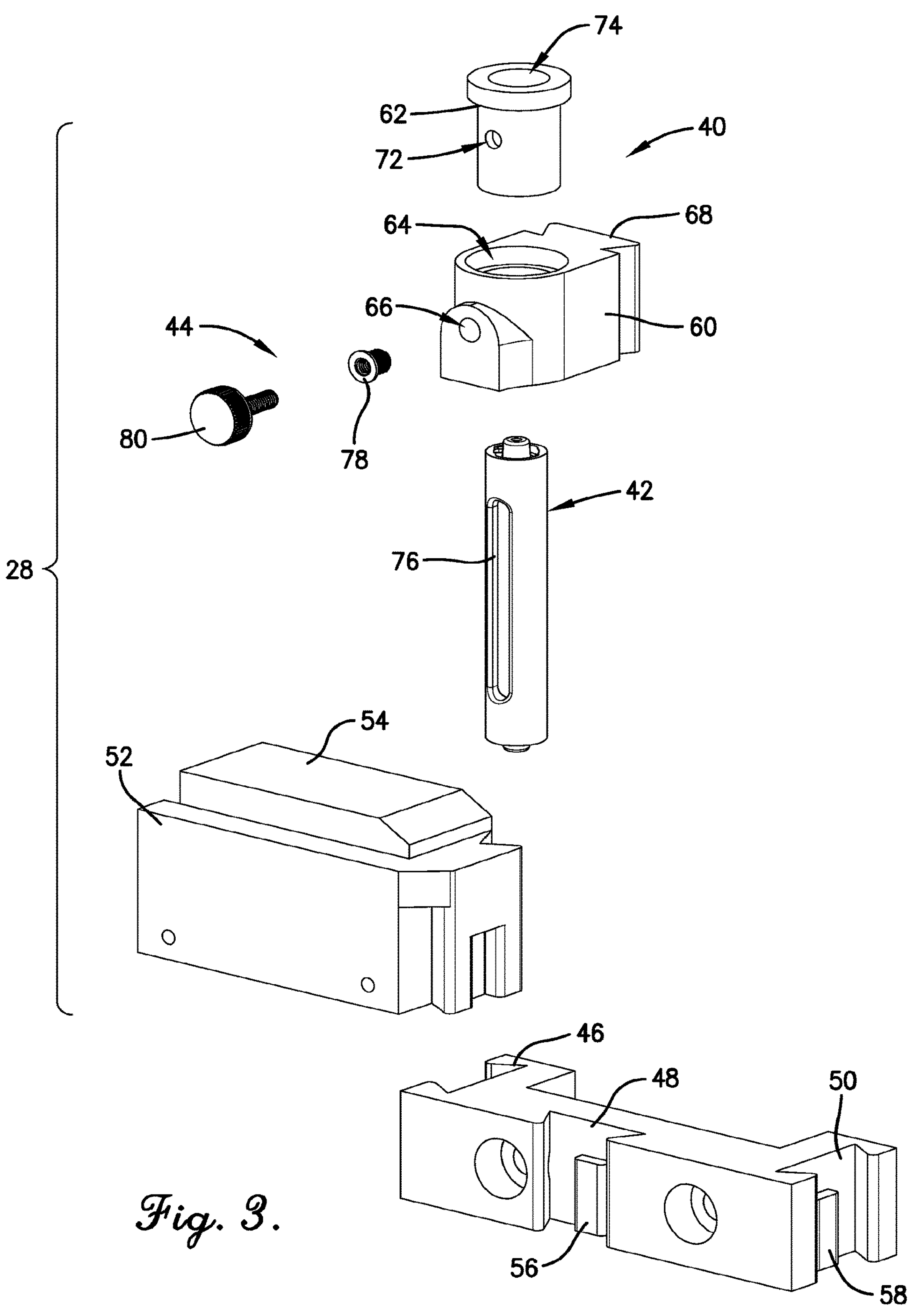
FIG. 3 is an exploded view of a front side of the nozzle holder assembly of FIG. 2.

Turning to FIG. 2, an exemplary nozzle assembly 28 is depicted. The nozzle assembly 28 may be representative of and comprise the same or similar elements as the other nozzle assemblies 30, 32, 34 depicted in FIG. 1. The nozzle assembly 28 comprises a mount 38, a shaft holder 40, a printer nozzle shaft 42, and a locking mechanism 44. The mount 38 is operable to be secured to the frame 24 (depicted in FIG. 1) and support the shaft holder 40. Turning to FIG. 3, the mount 38 may comprise a plurality of dovetail slots 46, 48, 50 for coupling to various components, such as a laser mount 52 that holds a laser 54. The slots 46, 48, 50 may include protrusions 56, 58 that are operable to abut portions of mounts to prevent such mounts from sliding off the mount 38, as discussed in more detail below.

Figure 4:
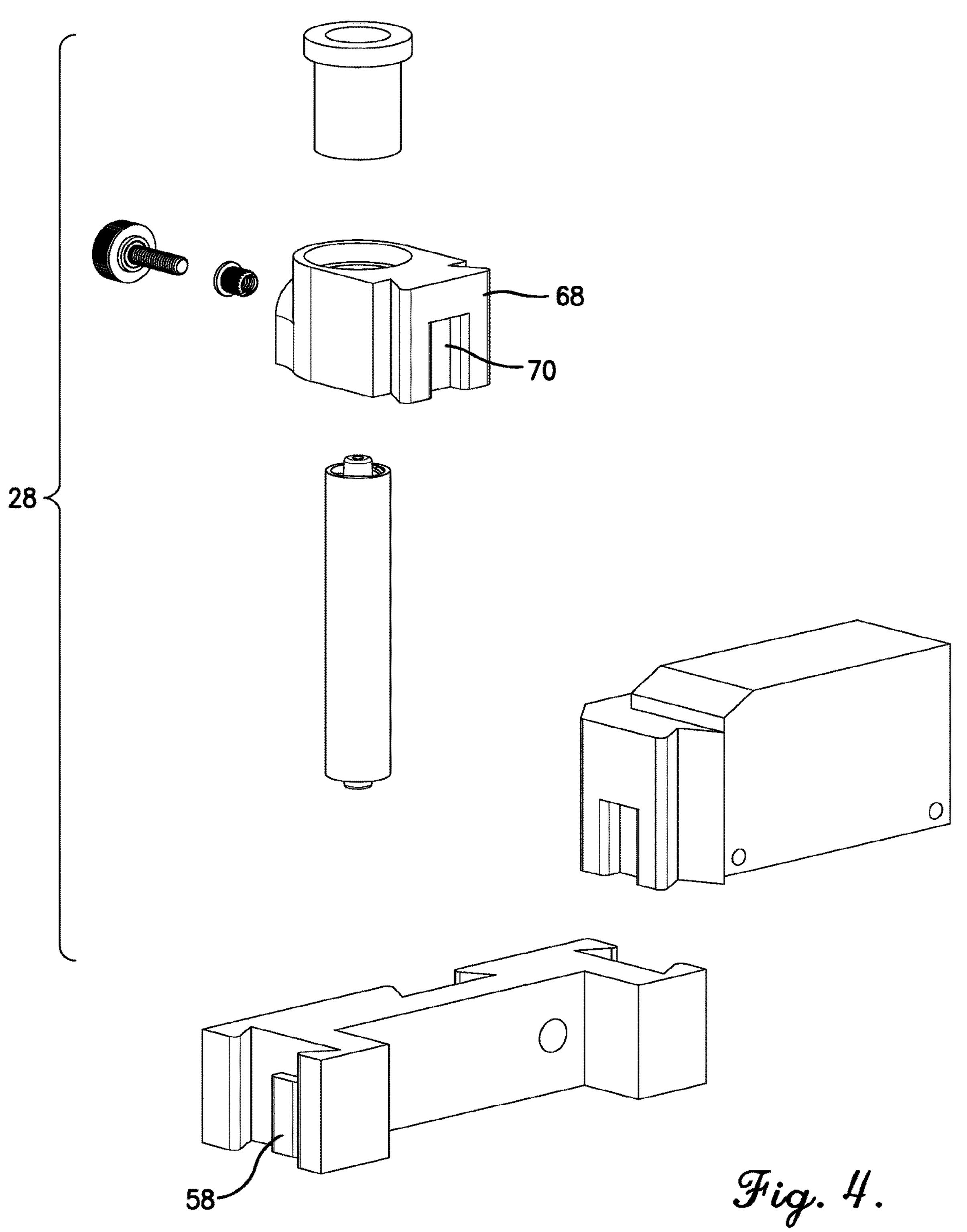
FIG. 4 is an exploded view of a back side of the nozzle holder assembly of FIG. 2.

The shaft holder 40 may comprise a bushing 60 and a bearing 62. The bushing 60 includes a channel 64 for receiving the bearing 62, an aperture 66 for receiving a portion of the locking mechanism 44, and a dovetail-shaped protrusion 68 for inserting into one of the dovetail slots 46, 48, 50. Turning briefly to FIG. 4, the dovetail-shaped protrusion 68 may comprise a cavity 70 operable to receive one of the mount protrusions 56, 58 and abut an upper portion thereof.

Turning back to FIG. 3, the bearing 62 is operable to be inserted into the channel 64 of the bushing 60. The bearing may include an aperture 72 that aligns with the aperture 66 of the bushing 60 for receiving a portion of the locking mechanism 44 and a channel 74 for receiving the printer nozzle shaft 42. The aligned apertures 66, 72 enable the locking mechanism 44 to hold the printer nozzle shaft 42 in its position relative to the bushing 60.

The printer nozzle shaft 42 is movably coupled to the mount 38. The shaft 42 may extend into the channel 74 of the bearing 62 and may include a groove 76 extending along its length. The groove 76 may be operable to receive a portion of the locking mechanism 44 and prevent the shaft 42 from dropping through the channel 74 or being pressed upwards and out of the channel 74.

The locking mechanism 44 is configured to fix the printer nozzle shaft 42 relative to the mount 38 at any position along a length of the shaft 42. The locking mechanism 44 may include an insert 78 and a thumb screw 80. The insert 78 may be secured in the aperture 66 of the bushing 60 and operable to receive the thumb screw 80. The insert 78 and the thumb screw 80 may be threaded so that the thumb screw 80 engages the insert 78. The thumb screw 80 may be operable to be rotated to extend through the insert 78 and the aperture 72 of the bearing 62 to engage the shaft 42 along its groove 76.

Figure 5:
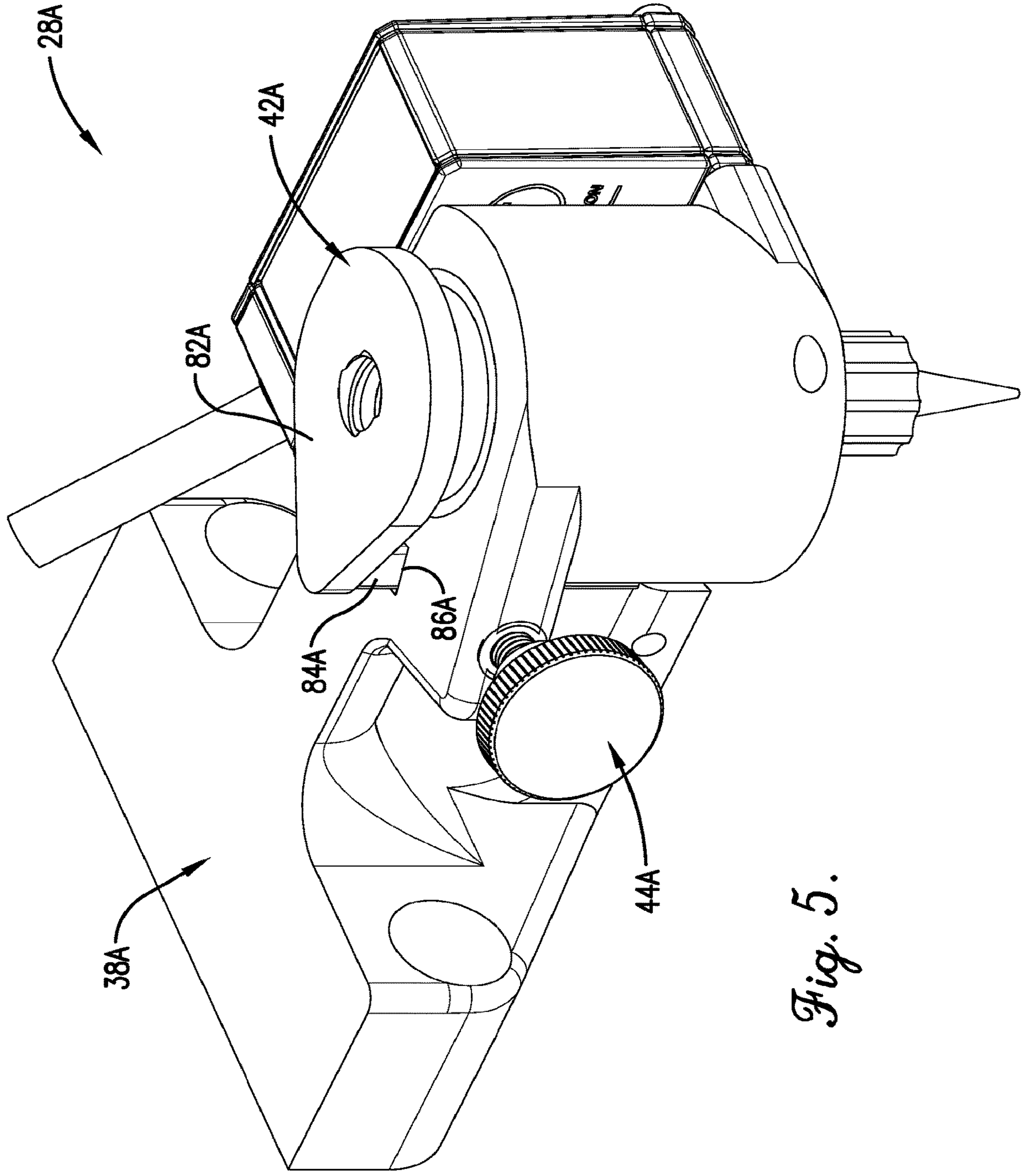
FIG. 5 is a nozzle holder assembly constructed in accordance with another embodiment of the present invention.

Turning to FIG. 5, a nozzle assembly 28A constructed in accordance with another embodiment of the present invention is depicted. The nozzle assembly 28A may comprise substantially similar components as nozzle assembly 28; thus, the components of nozzle assembly 28A that correspond to similar components in nozzle assembly 28 have an ‘A’ appended to their reference numerals. The principal difference between nozzle assembly 28A and nozzle assembly 28 is that the nozzle shaft 42A includes a flange 82A and a pin 84A extending downwardly from the flange 82A, the mount 38A includes a cavity 86A that receives the pin 84A, and the locking mechanism 44A is configured to engage the pin 84A.

Figure 6:
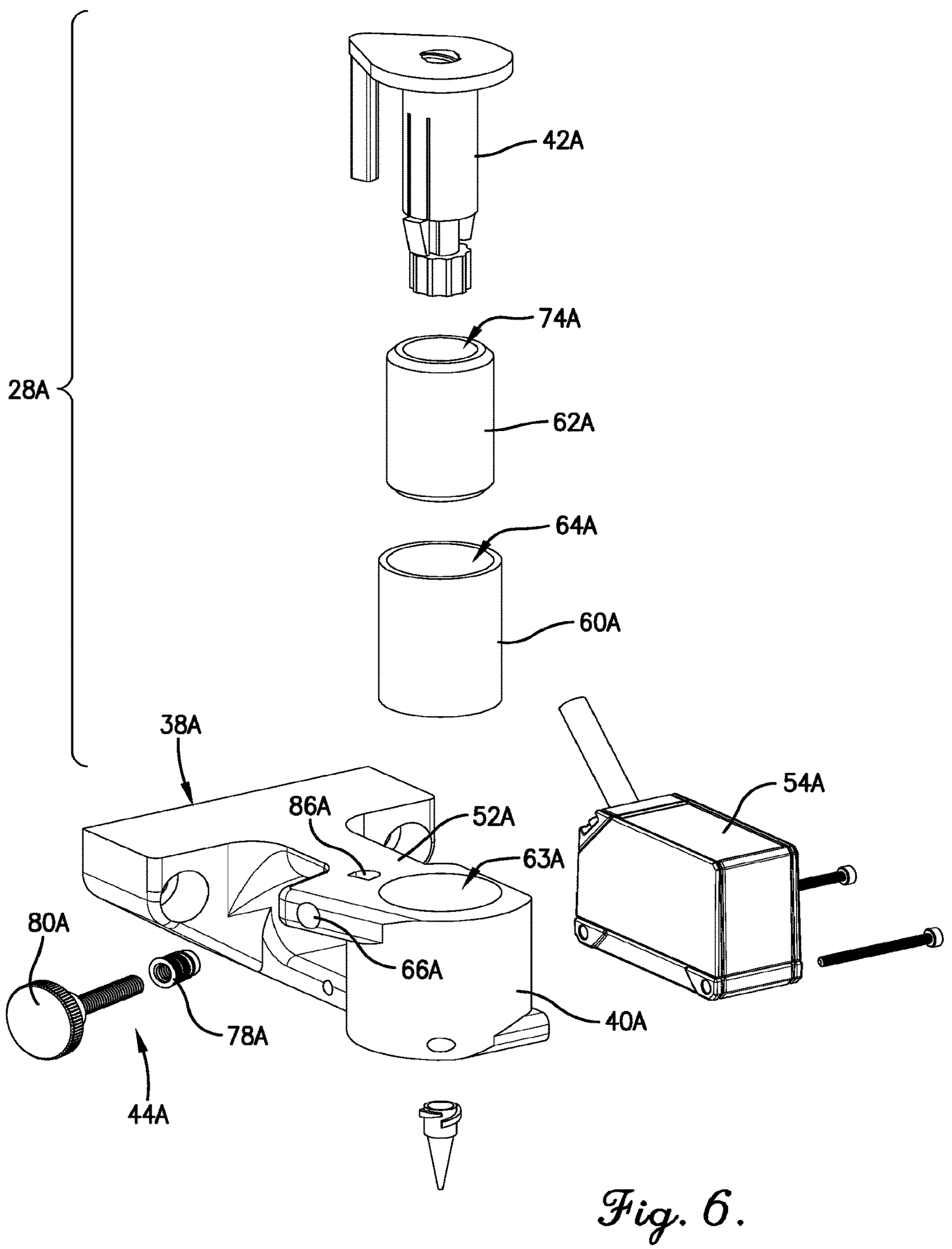
FIG. 6 is an exploded view of the nozzle holder assembly of FIG. 5.

Turning to FIG. 6, the nozzle assembly 28A may be representative of and comprise the same or similar elements as the other nozzle assemblies 30, 32, 34 depicted in FIG. 1. The mount 38A is operable to be secured to the frame 24 (depicted in FIG. 1) and may be integrated with the shaft holder 40A. The mount 38A may also be integrated with the laser mount 52A that holds the laser 54A. The cavity 86A may be positioned proximate to the shaft holder 40A and have an asymmetrical shape for receiving the pin 84A of the nozzle shaft 42A so that the shaft 42A remains at a certain orientation when coupled to the mount 38A. The aperture 66A may be in communication with the cavity 86A.

The bushing 60A is operable to slide into a channel 63A of the shaft holder 40A, and the bearing 62A is operable to slide into the channel 64A of the bushing 60A. The bearing 62A may include a channel 74A for receiving the printer nozzle shaft 42A. The printer nozzle shaft 42A is coupled to the bearing 62A, which are together movably coupled to the bushing 60A. The flange 82A may extend over the cavity 86A of the mount 38A, and the pin 84A may have a complementary shape to the shape of the cavity 86A.

The locking mechanism 44A is configured to fix the printer nozzle shaft 42A relative to the mount 38A at any position along a length of the shaft 42A. The insert 78A may be secured in the aperture 66A of the shaft holder 40A and operable to receive the thumb screw 80A. The thumb screw 80A may extend through the insert 78A and engage the pin 84A in the cavity 86A, thereby securing the nozzle shaft 42A relative to the mount 38A.

Figure 7:
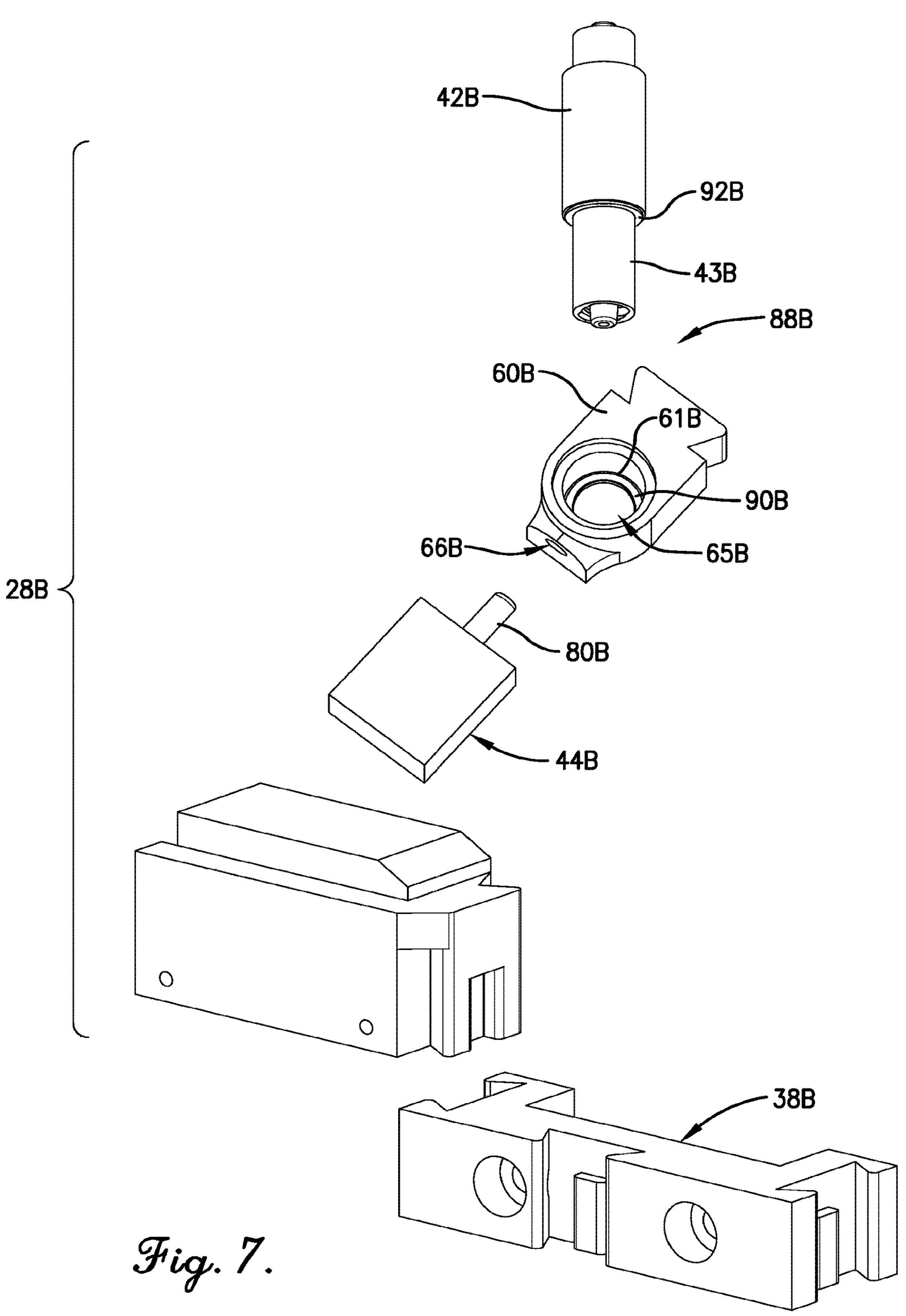
FIG. 7 is an exploded view of a nozzle holder assembly constructed in accordance with another embodiment of the present invention.

Turning to FIG. 7, a nozzle assembly 28B constructed in accordance with another embodiment of the present invention is depicted. The nozzle assembly 28B may comprise substantially similar components as nozzle assembly 28; thus, the components of nozzle assembly 28B that correspond to similar components in nozzle assembly 28 have a 'B' appended to their reference numerals. The principal difference between nozzle assembly 28B and nozzle assembly 28 is that the nozzle assembly 28B includes a sensor 88B, and the locking mechanism 44B comprises an actuator with a locking pin 80B that engages the nozzle shaft 42B.

The sensor 88B is configured to detect movement between the printer nozzle shaft 42B and the mount 38B. The sensor 88B may comprise a pair of conductive contacts 90B, 92B that form a closed circuit when in contact with another. However, the sensor 88B may be any type of sensor and arranged any number of ways without departing from the scope of the present invention.

The locking mechanism 44B may comprise a pneumatic actuator that causes the locking pin 80B to extend outwardly, enter the bushing aperture 66B, and engage the print nozzle shaft 42B to secure its movement relative to the bushing 60B. The pneumatic actuator may also be configured to actuate the locking pin 80B so that it retracts away from the print nozzle shaft 42B allowing the shaft 42B to move relative to the bushing 60B. The bushing 60B may include an inwardly extending wall 61B that supports the contact 90B. The wall 61B may have a hole 65B through which a lower portion 43B of the shaft 42B extends. The shaft 42B may move within the bushing 60B and rest on the wall 61B so that the contacts 90B, 92B are touching each other.

Turning to FIG. 8, selected components of the printer 10 is depicted. The controller 36 may comprise a communication element 94, a memory element 96, and a processing element 98. The communication element 94 may generally allow communication with systems or devices external to the controller 36. The communication element 94 may include signal or data transmitting and receiving circuits, such as antennas, amplifiers, filters, mixers, oscillators, digital signal processors (DSPs), and the like. The communication element 94 may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication element 94 may be in communication with the processing element 98 and the memory element 96.

The memory element 96 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 96 may be embedded in, or packaged in the same package as, the processing element 98. The memory element 96 may include, or may constitute, a "computer-readable medium". The memory element 96 may store the instructions, code, code segments, software, firmware, programs, applications, apps, services, daemons, or the like that are executed by the processing element 98.

The processing element 98 may include processors, microprocessors (single-core and multi-core), microcontrollers, DSPs, field-programmable gate arrays (FPGAs), analog and/or digital application-specific integrated circuits (ASICs), or the like, or combinations thereof. The processing element 98 may generally execute, process, or run instructions, code, code segments, software, firmware, programs, applications, apps, processes, services, daemons, or the like. The processing element 98 may also include hardware components such as finite-state machines, sequential and combinational logic, and other electronic circuits that can perform the functions necessary for the operation of the current invention. The processing element 98 may be in communication with the other electronic components through serial or parallel links that include address busses, data busses, control lines, and the like.

For example, the processing element 98 of the controller 36 may be in communication with one or more of the actuators 26, the locking mechanism 44B of each of the nozzle assemblies, and/or the sensor 88B of each of the nozzle assemblies. The processing element 98 may be in communication with the above components via the communication element 94 and/or direct wiring. The processing element 98 may be configured to send and/or receive information to and/or from the above components. The processing element 98 may also be configured to send and/or receive commands to and/or from the above components.

The processing element 98 may be configured to direct the actuators 26 to actuate portions of the frame of the printer so that the nozzle assemblies are lowered to the platform and/or to their respective objects. In some embodiments, the actuators 26 may be manually directed and/or the processing element 98 may be configured to relay external commands, such as commands from a user interface receiving inputs from a user. The distances between the assemblies and their respective printing surfaces (the objects and/or locations on the platform where the assemblies make contact) may be slightly different. Thus, as the assemblies are lowered, some of the nozzle shafts may move vertically relative to their respective mounts before the rest of the assemblies make contact.

Once the nozzle assemblies have all made contact with the platform and/or their respective objects, the processing element 98 may be configured to direct the actuators 26 to cease actuation of the frame. In some embodiments, the processing element 98 may be configured to receive from the sensor 88B of each of the assemblies a signal indicative of their respective assembly being in contact with the platform and/or their respective objects.

For example, the processing element 98 may be connected to both the contacts 90B, 92B (depicted in FIG. 7) of each of the assemblies, and the processing element 98 may apply voltages to one of the contacts of each of the assemblies so that once the contacts are not touching, the contacts will no longer have substantially similar voltages. Thus, the processing element 98 can determine that the contacts are not touching and therefore their respective assembly is in contact with the platform and/or its respective object. In some embodiments, the processing element 98 may be configured to activate an indicator light 89 associated with one of the assemblies when that assembly is in contact with its respective object and/or the platform. Additionally or alternatively, the processing element 98 may be configured to active the indicator light 89 when it has determined that all the assemblies have made contact with their respective object and/or the platform.

The processing element 98 may be configured to stop directing the actuators 26 to actuate the frame to move the assemblies only after receiving signals indicative of contact from the sensor 88B of each of the assemblies. The processing element 98 may be configured to then direct the actuator of the locking mechanism 44B of each of the assemblies to actuate their respective locking pins to secure the nozzle shaft of each of the assemblies in their respective positions. The processing element 98 may be configured to register the current positions of the assemblies as origins or starting positions for a printing process.

Figure 9:
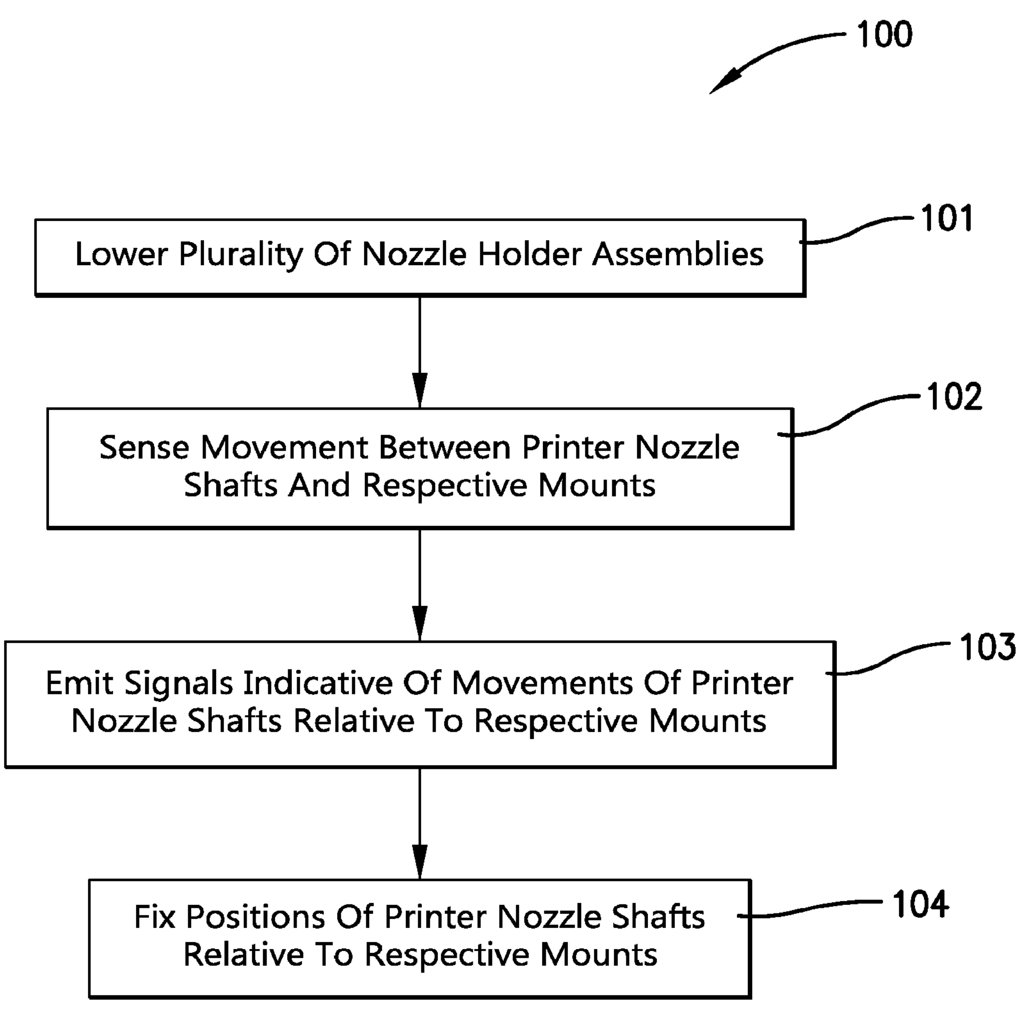
FIG. 9 is a flowchart depicting exemplary steps of a method according to an embodiment of the present invention.

The flow chart of FIG. 9 depicts the steps of an exemplary method 100 of calibrating a three-dimensional printer. In some alternative implementations, the functions noted in the various blocks may occur out of the order depicted in FIG. 9. For example, two blocks shown in succession in FIG. 9 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIGS. 1-8. The steps of the method 100 may be performed by the controller 36 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium (s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 101, a plurality of nozzle holder assemblies may be lowered. This step may include directing, via a processing element, one or more actuators to lower the assemblies. The actuators may actuate the frame so that the assemblies are shifted toward starting positions on printing surfaces Referring to step 102, relative movements between the printer nozzle shafts and their mounts are sensed. The relative movements may be sensed via one or more sensors, such as contacts positioned on the assemblies that are in contact with one another when the nozzle shafts are not pressing against their respective objects or the platform.

Referring to step 103, signals indicative of the movements of the nozzle shafts may be emitted. The signals may be emitted via the sensors, which may comprise active sensors. Alternative or additionally, the signals may be emitted by way of passive detection circuitry. This step may include emitting a signal when movement at one or more of the shafts and/or when all the shafts have moved. The signal may comprise a signal to a processing element and/or activation of one or more indicator lights.

Referring to step 104, positions of the printer nozzle shafts may be fixed relative to their respective mounts. This may include rotating thumb screws to engage respective shafts. Alternatively or additionally, this step may include directing, via a processing element, actuators of locking mechanisms to actuate locking pins to engage respective shafts.

The method 100 may include additional, less, or alternate steps and/or device(s), including those discussed elsewhere herein.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A nozzle holder assembly for a three-dimensional printer, the nozzle holder assembly comprising:

a mount operable to be secured to the three-dimensional printer;

a printer nozzle shaft movably coupled to the mount and operable to shift relative to the mount along a predetermined length, the printer nozzle shaft including an elongated groove extending in a longitudinal direction of the printer nozzle shaft; and a locking mechanism with a protruding portion and an actuator configured to actuate the protruding portion such that the protruding portion engages the printer nozzle shaft in the elongated groove to fix the printer nozzle shaft relative to the mount at any position along the predetermined length.

2. The nozzle holder assembly of claim 1, further comprising a sensor configured to detect movement between the printer nozzle shaft and the mount.

3. The nozzle holder assembly of claim 2, wherein the sensor is configured to emit a signal representative of movement between the printer nozzle shaft and the mount.

4. The nozzle holder assembly of claim 1, further comprising a shaft holder operatively associated with the mount, wherein the printer nozzle shaft is movably coupled to the mount via the shaft holder.

5. The nozzle holder assembly of claim 4, wherein the shaft holder is shiftable relative to the mount.

6. The nozzle holder assembly of claim 4, wherein the shaft holder defines a channel through which the printer nozzle shaft extends.

7. The nozzle holder assembly of claim 6, wherein the channel is a first channel, and the shaft holder includes a bearing extending into the first channel and defining a second channel through which the shaft extends.

8. The nozzle holder assembly of claim 1, wherein the protruding portion comprises a locking pin.

9. The nozzle holder assembly of claim 1, wherein the locking mechanism comprises a fastener.

10. A three-dimensional printer for printing a plurality of parts, the printer comprising:

a build platform for supporting the plurality of parts;

a frame shiftable above the build platform; and a plurality of nozzle assemblies attached to the frame, each of the plurality of nozzle assemblies comprising:

a mount operable to couple to the frame, a printer nozzle shaft movably coupled to the mount along a predetermined length and including an elongated groove extending in a longitudinal direction of the printer nozzle shaft, and a locking mechanism with a protruding portion and an actuator configured to actuate the protruding portion such that the protruding portion engages the printer nozzle shaft in the elongated groove to fix the printer nozzle shaft relative to the mount at any position along the predetermined length.

11. The three-dimensional printer of claim 10, wherein each of the plurality of nozzle assemblies comprises a sensor configured to detect movement between the printer nozzle shaft and the mount.

12. The three-dimensional printer of claim 11, wherein the sensor of each of the plurality of nozzle assemblies is configured to emit a signal representative of movement between the printer nozzle shaft and the mount.

13. The three-dimensional printer of claim 10, wherein each of the plurality of nozzle assemblies comprise:

a shaft holder operatively associated with the mount, wherein the printer nozzle shaft is movably coupled to the mount via the shaft holder.

14. The three-dimensional printer of claim 13, wherein the shaft holder of each of the plurality of nozzle assemblies is shiftable relative to the mount.

15. A nozzle holder assembly for a three-dimensional printer, the nozzle holder assembly comprising:

a mount operable to be secured to the three-dimensional printer;

a printer nozzle shaft movably coupled to the mount and operable to shift relative to the mount along a predetermined length, the printer nozzle shaft including an elongated groove extending in a longitudinal direction of the printer nozzle shaft; and a locking mechanism with a protruding portion operable to shift to engage the printer nozzle shaft in the elongated groove so as to fix the printer nozzle shaft relative to the mount at any position along the predetermined length.

* * * * *